(12) United States Patent
Allen et al.

(10) Patent No.: US 8,373,391 B1
(45) Date of Patent: Feb. 12, 2013

(54) RECHARGEABLE HAND-HELD DEVICES USING CAPACITORS, SUCH AS SUPERCAPACITORS

(75) Inventors: Kevin Allen, Canyon Country, CA (US); Terry Peterson, Eagle Rock, CA (US); Joe C. Fielding, Moorpark, CA (US)

(73) Assignee: Esterline Technologies Corporation, Bellevue, WA (US)

( * ) Notice: Subject to any disclaimer, the term of this patent is extended or adjusted under 35 U.S.C. 154(b) by 582 days.

(21) Appl. No.: 12/573,035

(22) Filed: Oct. 2, 2009

Related U.S. Application Data (60) Provisional application No. 61/102,329, filed on Oct. 2, 2008.

(51) Int. Cl.
*H02J 7/00* (2006.01)
(52) U.S. Cl. .......................... 320/115; 320/103; 320/167
(58) Field of Classification Search .................. 320/103, 320/115, 140, 166, 167
See application file for complete search history.

(56) References Cited

U.S. PATENT DOCUMENTS

| | | | |
|---|---|---|---|
| 8,148,954 B1 * | 4/2012 | Kehlstadt et al. | 320/166 |
| 2008/0315829 A1 * | 12/2008 | Jones et al. | 320/103 |

* cited by examiner

*Primary Examiner* — Edward Tso
*Assistant Examiner* — Aaron Piggush
(74) *Attorney, Agent, or Firm* — Perkins Coie LLP

(57) ABSTRACT

Systems devices and methods for flash charging a portable device with a charging device. The portable device may be a ruggedized hand-held controller. In some examples, the portable device includes a capacitive power supply which comprises one or more capacitors, e.g. supercapacitors. In use, the capacitive power supply may receive charge, store the charge, and provide power to power-using components of the portable device, when needed. In some examples, the system includes a charging device, such as a docking station. The charging device may couple to the portable device to charge the portable device. The charging device may include a capacitive power supply, which may comprise one or more capacitors, such as supercapacitors. In some cases, the system flash charges the capacitive power supply within the portable device, via the capacitive power supply of the charging device.

14 Claims, 7 Drawing Sheets

RECHARGEABLE HAND-HELD DEVICES USING CAPACITORS, SUCH AS SUPERCAPACITORS

CROSS REFERENCE TO RELATED APPLICATIONS

The present application is related to and claims the benefit of priority to U.S. Provisional Patent Application No. 61/102,329, filed Oct. 2, 2008 and entitled RECHARGEABLE HAND-HELD DEVICES USING CAPACITORS, SUCH AS SUPERCAPACITORS, which is incorporated herein by reference in its entirety.

TECHNICAL FIELD

The present disclosure is related to systems, devices and methods for charging a portable device with a charging device. In some embodiments, the present disclosure may relate to hand-held devices and charging systems, and also to wireless, rechargeable hand-held devices and charging systems.

BACKGROUND

Typical portable devices, e.g. hand-held devices, operate using power from batteries, such as batteries that are disposable or rechargeable. However, batteries are limited in the amount of energy that they supply to a device, and often provide a less than desirable time of operation for a device. In addition, batteries can be heavy and require hazardous material recycling procedures for their disposal.

Unlike disposable batteries, which can be used once, rechargeable batteries can be utilized many times. However, they too can be problematic. For example, typical rechargeable batteries require long periods of time (e.g., hours or more) to recharge, especially with respect to their use time. Additionally, they have a limited and sometimes low number of recharge cycles, and recharging degrades their charging capabilities. That is, a typical rechargeable battery stores less voltage for a shorter period of time after each recharging of the battery.

Safety guidelines regulate the use of some portable devices, e.g. hand-held devices, such as ruggedized hand-held controllers used in military and other similar operations. For example, because of the drawbacks described herein, battery operated controllers may be tethered to a battery pack. During an operation, a user may exchange partially depleted batteries with freshly charged batteries to ensure the controller is fully powered during the operation. Thus, the battery pack contains at least two sets of batteries, one of which is always recharging.

These and other drawbacks exist with respect to battery-operated devices.

SUMMARY

Systems devices and methods for flash charging a portable device with a charging device that employ a capacitive power supply, such as a capacitor.

The portable, e.g. hand-held, device may be a ruggedized controller. In some examples, the portable device includes a capacitive power supply that comprises one or more capacitors, e.g. supercapacitors. The capacitive power supply may be contained within a handle of the portable device (e.g. within a handle of a hand-held controller). In use, the capacitive power supply may receive charge, store the charge, and provide power to power-using components of the portable device, when needed and/or required.

In some examples, the system includes a charging device, such as a docking station. The charging device may engage or couple to the portable device to charge the portable device. The charging device may include a capacitive power supply, which may comprise one or more capacitors, such as supercapacitors, that, in use, store and provide energy to be transferred to a capacitive power supply within the portable device. In some cases, the system flash charges the capacitive power supply within the portable device, via the capacitive power supply of the charging device. The system may be configured to recharge the capacitive power supply of the charging device while the charging device recharges the capacitive power supply of the portable device.

This Summary is provided to introduce a selection of concepts in a simplified form that are further described herein in the Detailed Description. This Summary is not intended to identify key features or essential features of the claimed subject matter, nor is it intended to be used as an aid in determining the scope of the claimed subject matter.

DETAILED DESCRIPTION

Overview

Described in detail herein are systems devices and methods for flash charging a portable device with a charging device that employ a capacitive power supply, such as a capacitor.

The portable, e.g. hand-held, device may be a ruggedized controller. In some examples, the portable device includes a capacitive power supply that comprises one or more capacitors, e.g. supercapacitors. The capacitive power supply may be contained within a handle of the portable device (e.g. within a handle of a hand-held controller). In use, the capacitive power supply may receive charge, store the charge, and provide power to power-using components of the portable device, when needed and/or required.

In some examples, the system includes a charging device, such as a docking station. The charging device may engage or couple to the portable device to charge the portable device. The charging device may include a capacitive power supply, which may comprise one or more capacitors, such as supercapacitors, that, in use, store and provide energy to be transferred to a capacitive power supply within the portable device. In some cases, the system flash charges the capacitive power supply within the portable device, via the capacitive power supply of the charging device. The system may be configured to recharge the capacitive power supply of the charging device while the charging device recharges the capacitive power supply of the portable device.

Using a capacitive power supply, e.g. capacitors, as the power supply in a portable device such a ruggedized controller provides numerous benefits to a user of the portable device over using batteries. The capacitive power supply does not need to be replaced and therefore the need and difficulty in sealing an access point is eliminated. Also, a capacitive power supply can be flash charged, allowing a controller to regain power in seconds, e.g. less than 10 seconds, instead of hours. They have a long life (e.g. 500,000 or even 1,000,000 duty cycles), and do not degrade after frequent recharging. They are lightweight, compact, and contain few toxins to the environment. Of course, there are other benefits in employing capacitors over batteries.

In some examples, the disclosure may provide a hand-held controller, comprising: a capacitive power supply, wherein the capacitive power supply is rechargeable and configured to provide power to the hand-held controller; and one or more control components, wherein the one or more control components are configured to control a vehicle in wireless communication with the hand-held controller.

In some examples, the disclosure may provide a method of charging a hand-held controller used to control vehicles over a wireless communication channel, the method comprising: charging a capacitor contained by a docking station; wherein the docking station includes a portion adapted to receive a hand-held controller; coupling the hand-held controller to the portion of the docking station adapted to receive the hand-held controller; and charging a capacitor contained by the hand-held controller using energy stored in the capacitor contained by the docking station.

The system will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Figure 1:
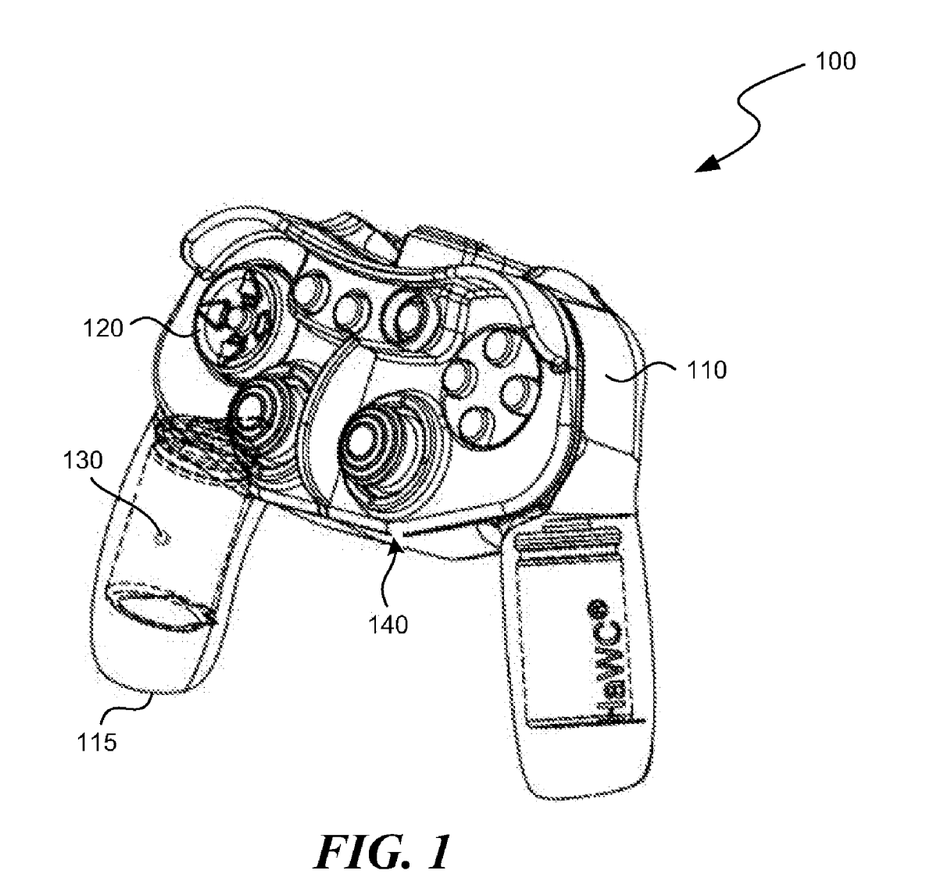
FIG. 1 is a schematic diagram illustrating a suitable hand-held controller with a capacitive power supply.

Referring to FIG. 1, a schematic diagram illustrating a portable device in the form of a suitable hand-held controller 100 with a capacitive power supply 130 is shown. The hand-held controller may include a housing 110 that partially encloses one or more input components 120. The hand-held controller 100 may include a plurality of power-using components, which may include one or more wireless components and/or the input components 120. The housing may have one or more handles 115 configured to be held by a user. The input components 120 may include touchpads, joysticks, buttons, dials, levers, and other components that facilitate control of hardware, such as devices in wireless communication with the hand-held controller 100. The hand-held controller 100 may be ruggedized or include various protection elements that enable a user to employ the controller in harsh environments. For example, the housing 110 may partially or fully seal the inside of the controller 100 from the environment.

The hand-held controller 100 of the illustrated embodiment can be configured to communicate with and/or control small and/or sighted vehicles, such as sighted aircraft, sighted land vehicles, and so on. For example, the hand-held controller 100 may be used with a remotely operated vehicle (ROV) used to detonate and/or disable bombs and other explosive devices. The hand-held controller 100 may control the vehicle as well as any components used is disabling the explosive device, such as cameras, microphones, sensors, robotic arms, water cannons, diagnostic equipment, and so on. In addition, the hand-held controller may communicate with and/or control unsighted vehicles via various display and/or output components (not shown) on or contained by the controller's housing 110.

The hand-held controller 100 may also include a capacitive power supply 130, which may include one or more capacitors, supercapacitors, and so on. Briefly, a capacitor (sometimes known as a condenser), refers to an electrical or electrochemical device that stores energy in an electric field between a pair of conductors, or plates. Storing energy, or charging, involves adding electric charges of equal magnitude, but opposite polarity, to the two plates.

A suitable capacitive power supply 130 may include one or more supercapacitors, electric double-layer capacitors (EDLCs), or ultracapacitors. These capacitors are electrochemical capacitors that have a high energy density with respect to a typical capacitor, and therefore are capable of large capacitances (e.g., several farads) at low working voltages. In some cases, a supercapacitor may act like two capacitors connected in series. Instead of a common dielectric layer, the supercapacitor contains an electrical double layer, creating an effective dielectric layer thickness that is very thin (a few nanometers). Combining that with a large surface area provides for the high capacitances. The supercapacitors can be formed of various different materials, including carbon nanotubes, conductive polymers, carbon aerogels, and so on.

The total capacitance of the capacitive power supply 130 of a portable device, e.g. the hand-held controller 100, may exceed 100 farads or even 200 farads. As an example, two Maxwell Technologies® ultracapacitors having model number BCAP0140E250 (a capacitance of 140 farads per ultracapacitor) may be used as the capacitive power supply 130 in the hand-held controller 100.

The hand-held controller 100 may also include an interface engageable with a charging device and configured to couple a capacitive power supply of the charging device to the capacitive power supply 130 of the hand-held controller 100. Accordingly, the capacitive power supply 130 of the hand-held controller can be flash charged by a current directly delivered from the capacitive power supply of the charging device. For example, the interface of the hand-held controller 100 may include a port, or some other docking element configured to couple or dock the controller 100 to a charging device, such as the docking station 200 shown in FIG. 2. Of course, the hand-held controller 100 may include other components or devices not shown in FIG. 1. For example, the controller 100 may include various display screens, indicators, audio components, wireless control components, and so on.

Figure 2:
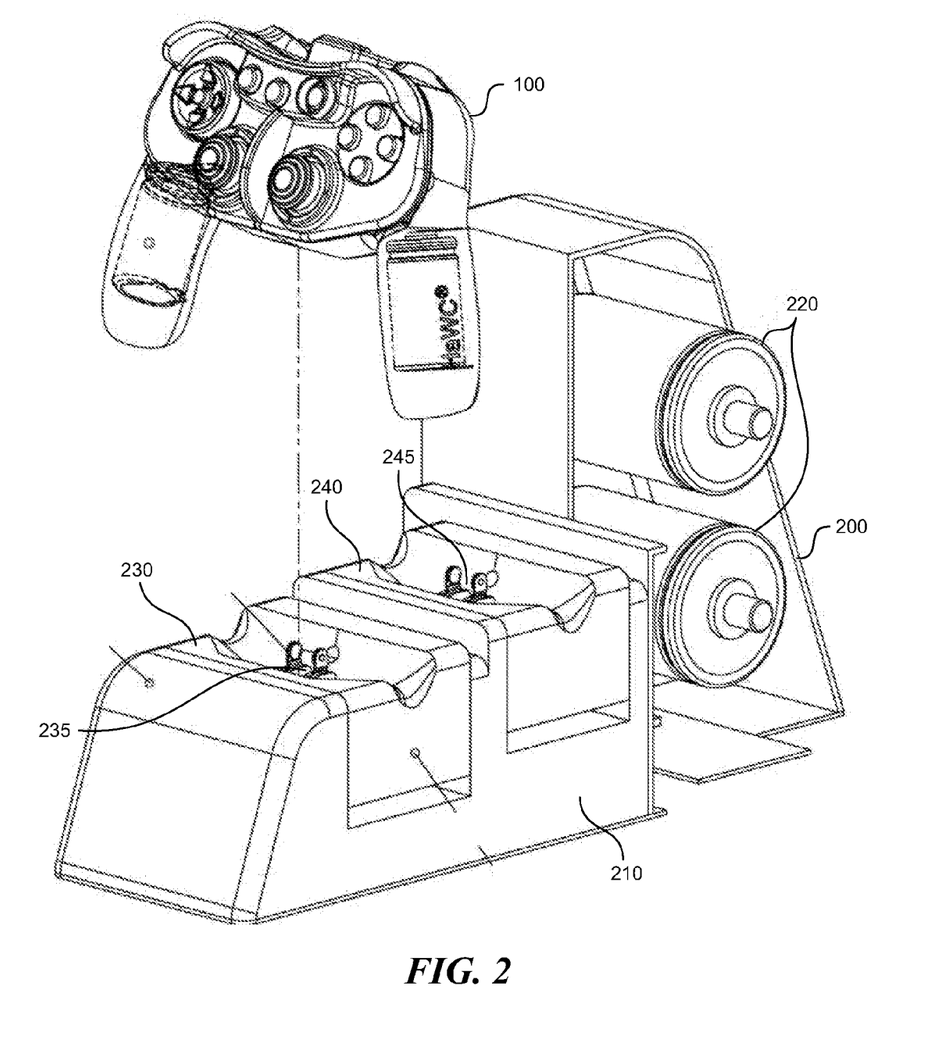
FIG. 2 is a schematic diagram illustrating a suitable hand-held controller and docking station.

Referring to FIG. 2, a schematic diagram illustrating a hand-held controller 100 and a docking station 200 is shown. The docking station 200 of the illustrated embodiment acts as a charging device. The docking station 200 may include a housing 210 that may contain a capacitive power supply 220, e.g. comprising two or more supercapacitors.

The total capacitance of the capacitive power supply 220 of a charging device, e.g. the docking station 200, may exceed 1000 farads or even 2000 farads. As an example, two Maxwell Technologies® ultracapacitors having model number BCAP1500E270 (a capacitance of 1500 farads per ultracapacitor) may be used as the capacitive power supply 220 in docking station 200.

The capacitive power supply 220 is configured to deliver a charge to the hand-held controller 100 for wireless operation of the hand-held device 100 after the hand-held controller 100 is removed from the docking station. To this end, the docking station 200 may comprise an interface engageable with the hand-held controller 100 and configured to couple (e.g. directly) the capacitive power supply 220 of the docking station 200 to the capacitive power supply 130 of the hand-held controller 100. The interface of the docking station 200 may include a charge contact 235.

By coupling the capacitive power supply 220 of the docking station to the capacitive power supply 130 of the hand-held controller in this way, a current can be directly delivered from the capacitive power supply 220 of the docking station to the capacitive power supply 130 of the hand-held controller 100, thus charging the capacitive power supply 130 of the hand-held controller 100. After a short period of time, the charges in the respective capacitive power supplies 130, 220 reach an equilibrium such that substantially little or no net current flows between the respective capacitive power supplies 130, 220. This process takes very little time, e.g. 10 seconds or less, 5 seconds or less, 3 seconds or less, or even a period of milliseconds, and is therefore referred to herein as "flash charging".

An initial flash charge of the hand-held controller 100 may take slightly longer than later flash charges of the hand-held controller 100, because the charge on the capacitive power supply 130 of the hand-held controller 100 may be non-zero for the later flash charges. For example, an initial flash charge of the hand-held controller 100 may take three seconds, compared with two seconds for a later flash charge.

In practice, flash charging of a portable device, such as the hand-held controller 100 shown in FIGS. 1 and 2, may involve large, substantially instantaneous, currents, e.g. of 30 Amps or more, 50 Amps or more or even 100 Amps or more. Therefore, in practice, it may be useful for the respective interfaces of the docking station 200 and the hand-held controller 100 to each be configured to (e.g. safely) carry a substantially instantaneous current of at least 30 Amps, at least 50 Amps or at least 100 Amps. It may further be useful for the respective interfaces of the docking station 200 and the hand-held controller 100 to each have a low resistance, to avoid large amounts of energy from being dissipated. To this end, the respective interfaces of the docking station 200 and the hand-held controller 100 may each comprise one or more copper contacts, which may be coated in DurAlloy®.

In one example arrangement, the respective interfaces of the docking station 200 and hand-held controller 100 each include a pair of contacts for contacting the other pair of contacts. Each contact may have a relatively large contact area, e.g. with dimensions of ¼ inch by ⅛ inch. The contacts of the hand-held controller 100 or the docking station 200 may be located within a recess of the hand-held controller 100 or docking station 200, in order to help prevent accidental contact with a user. In another example arrangement, the respective interfaces of the docking station 200 and hand-held controller 100 each include a busbar.

In order to increase the amount of charge that is transferred from the capacitive power supply 220 of the docking station 200 to the capacitive power supply 130 of the hand-held controller 100, it may be useful for the capacitive power supply 220 of the docking station 200 to have a capacitance which is greater than the capacitance of the capacitive power supply 130 of the hand-held controller 100. For example, the capacitive power supply 220 of the docking station 200 may have a capacitance at least two times, five times or ten times larger than the capacitance of the capacitive power supply 130 of the hand-held controller 100.

To improve safety, the docking station 200 may comprise a biasing mechanism for biasing the hand-held controller 100 away from a position in which the interface of the hand-held controller 100 engages with the interface of the docking station. In this way, a user may need to manually exert a force on the hand-held controller 100 in order to move the hand-held controller into a position where the capacitive power supply 130 of the hand-held controller 100 can be charged by the docking station 200. The biasing mechanism may, for example, include a spring.

The docking station 200 may include an additional interface engageable with the hand-held controller 100 and configured to couple to the capacitive power supply 130 of the hand-held controller 130, thereby allowing the capacitive power supply 130 of the hand-held controller 100 to be discharged by a current which flows from the capacitive power supply 130 of the hand-held controller 100 through the additional interface. The additional interface of the docking station 200 may include a discharge contact 245. The docking station 200 may further comprise one or more resistive components for dissipating the current which flows from the capacitive power supply 130 of the hand-held controller 100 through the additional interface. For example, the one or more resistive components may include six 5 Ohm resistors arranged in series, making a total resistance of 30 Ohms.

The docking station 200 may also include one or more docking portions adapted to receive the portable device, e.g. in the form of one or more charging cradles 230 and/or discharging cradles 240. Each charging cradle 230 may have a respective interface for charging the hand-held controller 100, e.g. including a charge contact 235. Each discharging cradle 240 may have a respective interface for discharging the hand-held controller 100, e.g. including a discharge contact 245. Of course, the docking station 200 may have more or fewer cradles, depending on the needs of the system employing the station 200. In some cases, one cradle may be operable to act to both charge and discharge a controller 100.

The cradles 230, 240 may be configured and/or adapted to receive a variety of different portable devices (e.g. controllers), or may be configured to only receive a certain type of portable device, e.g. a certain type of controller. For example, cradle 230, and a portion of the housing 210 proximate to cradle 230, may be adapted to receive controller 100 in such a way as to seal the charge contact 235 from the environment.

Of course, the docking station 200 may include components not shown in FIG. 2. For example, the station 200 may include a means for recharging the capacitive power supply 220 of the docking station 200. Such means may, for example, comprise a cable, such as a power chord or a USB cable, that receives electrical power from an outlet or other external power source to charge the capacitive power supply 220. The docking station 200 may also include various input and output components, such as display screens, indicator lights, touchpads, keypads, buttons, and so on, that facilitate control and/or operation of the docking station 200. In addition, the docking station 220 may include circuitry that helps to facilitate flash charging of a hand-held controller 100, which circuitry will now be discussed.

Figure 3:
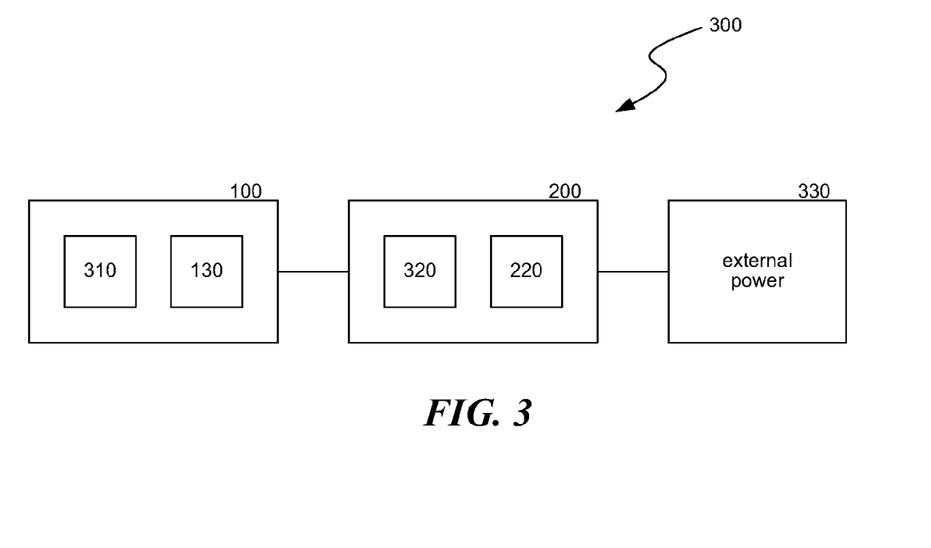
FIG. 3 is a block diagram illustrating a system for charging a hand-held device with a docking station.

Referring to FIG. 3, a block diagram illustrating a system 300 for flash charging a portable device with a charging device is shown. The system 300 may include a hand-held controller 100, having a capacitive power supply 130 including one or more capacitive devices, and charging circuitry 310, in communication 305 with a charging device. The charging device may include a docking station 200 having a capacitive power supply 220 including one or more capacitive devices, and charging circuitry 320, which receives power from an external power supply 330.

As discussed above, the capacitive power supply 130 may include one or more capacitive devices such as supercapacitors and/or other double layer capacitors. The capacitors increase the operating time between charges compared to traditionally powered controllers. These capacitors may provide a large duty cycles, such as 500,000 or 1,000,000 recharges or more. Even at full use, the number of duty cycles virtually ensures that the supercapacitor will not need to be replaced during the life span of the controller.

Figure 4:
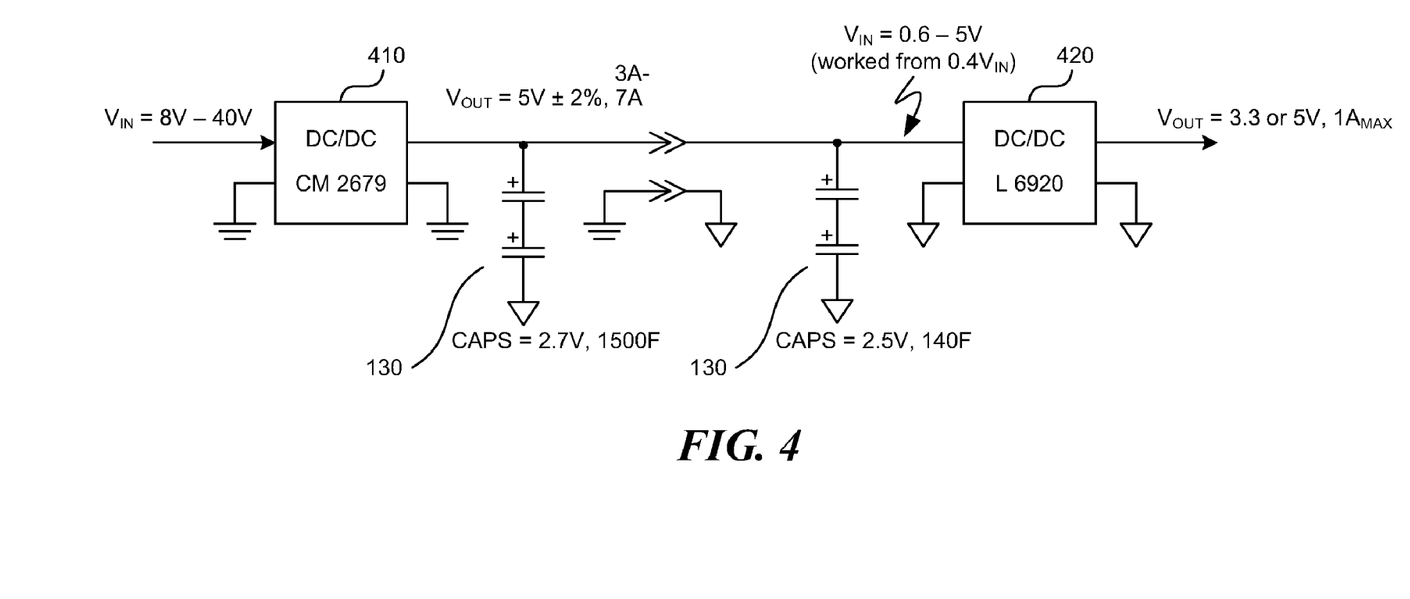
FIG. 4 is a schematic diagram illustrating a suitable circuit used in charging the capacitive power supply of the hand-held device.

In some examples, the charging circuitry 310, 320 includes one or more power converters, e.g. DC-to-DC power converters 410, 420 (FIG. 4). The DC-to-DC power converters help in supplying suitable voltage levels to various components of the controller 100 or docking station 200. The circuitry can help to facilitate flash charging of the hand-held controller 100 (e.g., seven seconds for 4 hours of operation), and will now be discussed in more detail. In other embodiments, other power converters can be used.

Referring to FIG. 4, a schematic diagram 400 illustrating suitable circuitry 310 used in charging the capacitive power supply of the controller 100 is shown. The schematic 400 includes a capacitive power supply 220 of the docking station 200 including two 1500 farad ultracapacitors (or supercapacitors), a capacitive power supply 130 of the hand-held controller 100 including two 140 farad ultracapacitors, as well as the two DC-to-DC converters 410, 420 discussed above. As shown in the diagram 400, in some examples the circuit, via the first DC-to-DC converter 410, receives current from an external power supply 330 at 8-40 volts, steps down the voltage and outputs the current at 5 volts which is used to charge the two 1500 farad capacitors of the capacitive power supply 220 of the docking station 200. In this way, the DC-to-DC power converter 410 controls the voltage of the current delivered from the external power supply 330 to the capacitive power supply 220 of the docking station 200. The second DC-to-DC power converter 420 receives current from the two 140 farad capacitors of the capacitive power supply 130 of the hand-held controller 100, which may have a lower voltage than before, and steps up the current back to 3.3 to 5 volts for use by the power-using components of the hand-held controller 100. In this way, the second power converter controls the voltage of current delivered by the capacitive power supply 130 of the hand-held controller 100 to the power-using components of the hand-held controller 100.

Figure 5:
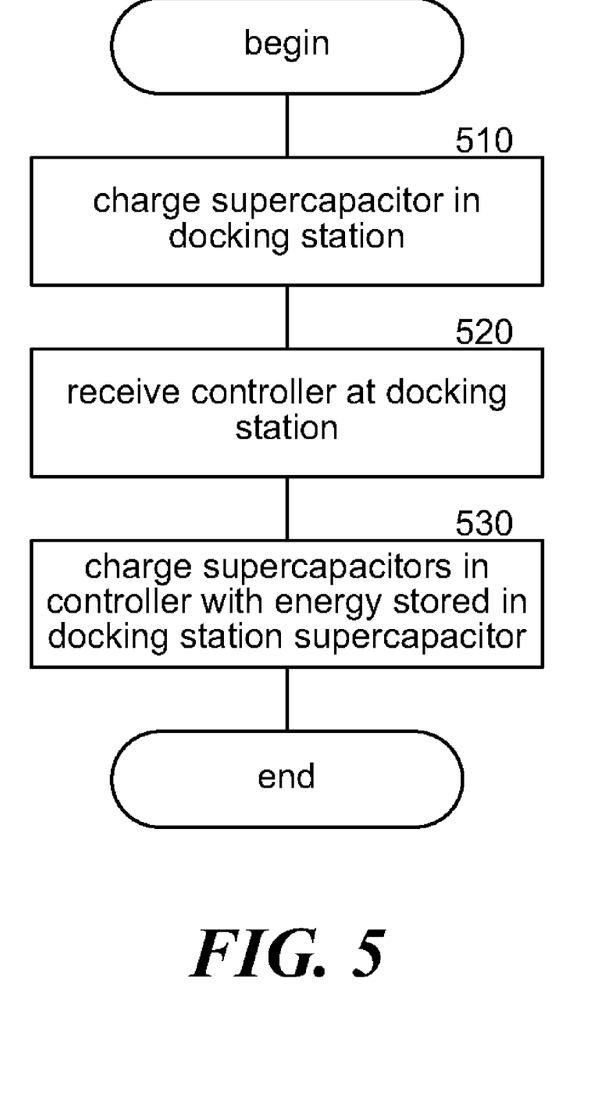
FIG. 5 is a flow diagram illustrating a routine for charging a hand-held device having a capacitive power supply.

As discussed herein, in some examples, the capacitors of the capacitive power supply 220 of the docking station 200 provide the energy used to charge the capacitors of the capacitive power supply 130 in the controller 100. Referring to FIG. 5, a flow diagram illustrating a routine 500 for charging a hand-held controller having a capacitive power supply is shown. FIG. 5 is a representative flow diagram that depicts processes used in some examples of the system. This flow diagram does not show all functions or exchanges of data, but instead provides an understanding of commands and data exchanged under the system. Those skilled in the relevant art will recognize that some functions or exchange of commands and data may be repeated, varied, omitted, or supplemented, and other aspects not shown may be readily implemented.

In step 510, the system charges the supercapacitors of a capacitive power supply 220 in a docking station 200. For example, the system may use a conventional power supply to receive the energy used to charge the supercapacitors in the docking station 200. In step 520, the system receives a hand-held controller 100 at the docking station 200. For example, cradle 230 of the docking station receives the hand-held controller 100. In this way, an interface of the docking station 200 engages with the hand-held controller 100 and couples the supercapacitors in the docking station 200 to supercapacitors of a capacitive power supply 130 in the hand-held controller 100. In step 530, the system charges the supercapacitors of the hand-held controller 100 using energy stored in the supercapacitors of the docking station 200. For example, upon receiving the hand-held controller 100 at the docking the station 200, the system, via flash charging or other mechanisms, transfers at least some of the charge stored in the supercapacitors of the docking station 200 (which may have a comparatively larger capacitance) to the supercapacitors of the controller 100 (which may have a comparatively smaller capacitance).

Charging one supercapacitor via another may assist in controlling an initial inrush current when the charging process begins, among other benefits. In some cases, the system concurrently replenishes the charge of the docking station supercapacitors when they are charging the controller supercapacitors.

Figure 6A:
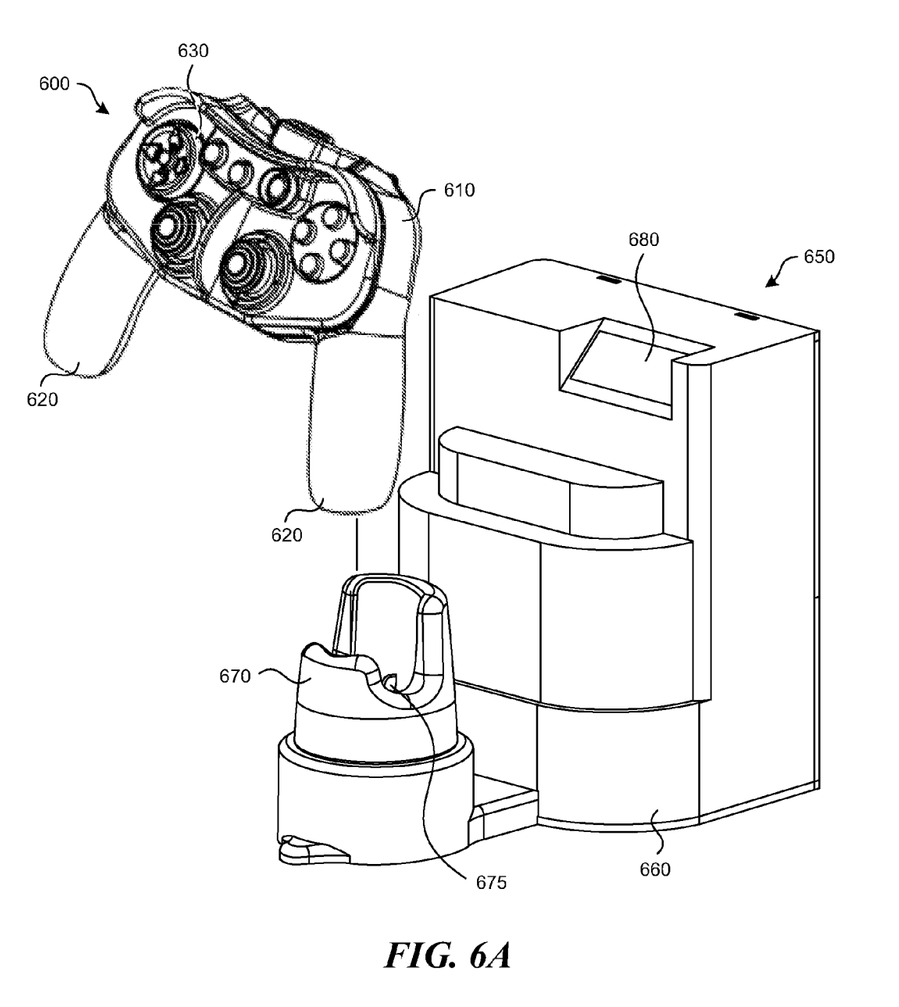
FIGS. 6a and 6b are schematic diagrams illustrating an alternative suitable hand-held controller and an alternative suitable docking station.
Figure 6B:
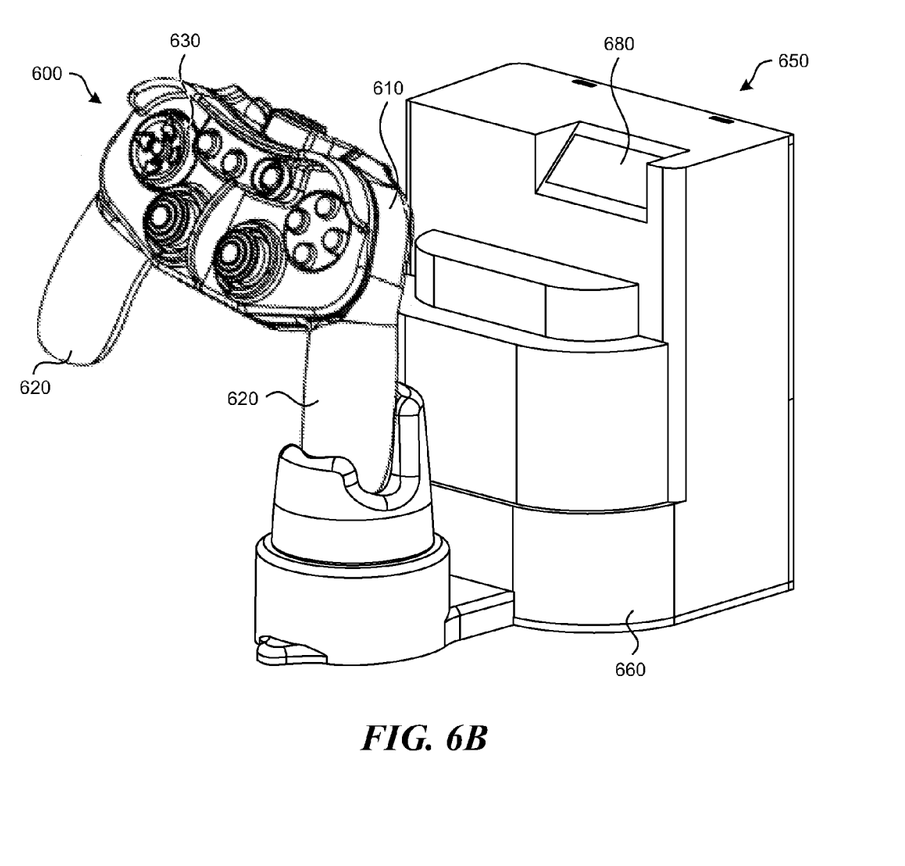

FIGS. 6a and 6b are schematic diagrams illustrating an alternative suitable hand-held controller 600 and an alternative suitable docking station 650. FIG. 6a shows the hand-held controller 600 disengaged from the docking port 600 whereas FIG. 6b shows the hand-held controller 600 engaged with the docking port 650.

The hand-held controller 600 is similar to the hand-held controller 100 shown in FIGS. 1 and 2, and includes, for example, a capacitive power supply (not shown), a housing 610, handles 620, input components 630, and an interface (not shown) for charging and/or discharging the hand-held controller 600.

The docking station 650 is similar to the docking station 200 shown in FIG. 2 and includes, for example, a capacitive power supply (not shown), a housing 660, a charging and/or discharging cradle 670, and an interface for charging and/or discharging the hand-held controller 600 which includes a contact 675. The docking station 650 also includes a visual display 680.

In contrast to the hand-held controller 100 shown in FIGS. 1 and 2, the interface of hand-held controller 600 is located in a handle 620 of the hand-held controller 600. Specifically, in this example, the interface of the hand-held controller 600 is located at a distal end of the handle 620. In this way, safety can be improved, because a user handling the controller 600 can hold the controller at a reasonable distance from the interface of the hand-held controller 600, whilst effecting engagement of the hand-held controller 600 with the docking station 650.

Conclusion

From the foregoing, it will be appreciated that specific examples of the system have been described herein for purposes of illustration, but that various modifications may be made without deviating from the spirit and scope of the system. For example, although hand-held controllers have been described, other types of devices can be employed. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A system for flash charging a portable device with a charging device, the system comprising a portable device and a charging device;
wherein the portable device comprises: a first interface;
a plurality of power-using components; and
a first capacitive power supply configured to deliver current to the power-using components;
wherein the charging device comprises:
a second capacitive power supply;
a first interface engageable with the portable device and configured to couple the second capacitive power supply of the charging device to the first capacitive power supply of the portable device thereby allowing the first capacitive power supply of the portable device to be flash charged by a current directly delivered from the second capacitive power supply of the charging device through the first interface; and
a second interface engageable with the portable device and configured to couple to the first capacitive power supply of the portable device, thereby allowing the first capacitive power supply of the portable device to be discharged by a current which flows from the first capacitive power supply of the portable device through the second interface.

2. A system according to claim 1 wherein:
the charging device is a docking station comprising a docking portion configured to receive the portable device; and
the first interface is configured to couple the second capacitive power supply of the docking station to the first capacitive power supply of the portable device if the portable device is received in the docking portion.

3. A system according to claim 1 wherein the capacitance of the second capacitive power supply of the charging device is greater than the capacitance of the first capacitive power supply of the portable device.

4. A system according to claim 1 wherein the interface is configured to carry a substantially instantaneous current of at least 30 Amps.

5. A system according to claim 1 wherein:
the portable device comprises a second interface engageable with the first interface of the charging device; and
the charging device comprises a biasing mechanism for biasing the portable device away from a position in which the second interface of the portable device engages with the first interface of the charging device.

6. A system according to claim 1 wherein the second interface of the portable device is located in a handle of the portable device.

7. A system according to claim 1 wherein the system includes a power converter configured to control the voltage of a current delivered from an external power supply to charge the second capacitive power supply of the charging device.

8. A system according to claim 7 wherein the power converter is located in the charging device.

9. A system according to claim 7 wherein the power converter is located in the portable device.

10. A system according to claim 1 wherein the portable device comprises a power converter, for controlling the voltage of the current delivered by the first capacitive power supply of the portable device to the power-using components of the portable device.

11. A system according to claim 1 wherein the first capacitive power supply of the portable device comprises one or more capacitors selected from the group consisting of supercapacitors, electric double-layer capacitors and ultracapacitors.

12. A system according to claim 1 wherein the second capacitive power supply of the charging device comprises one or more capacitors selected from the group consisting of supercapacitors, electric double-layer capacitors and ultracapacitors.

13. A system according to claim 1 wherein the charging device comprises one or more resistive components for dissipating the current which flows from the first capacitive power supply of the portable device through the second interface.

14. A system according to claim 1 wherein the charging device comprises a means for recharging the capacitive power supply of the charging device.

* * * * *